June 1, 1943.                H. D. MADDEN                2,320,946
METER CASING
Filed March 2, 1940
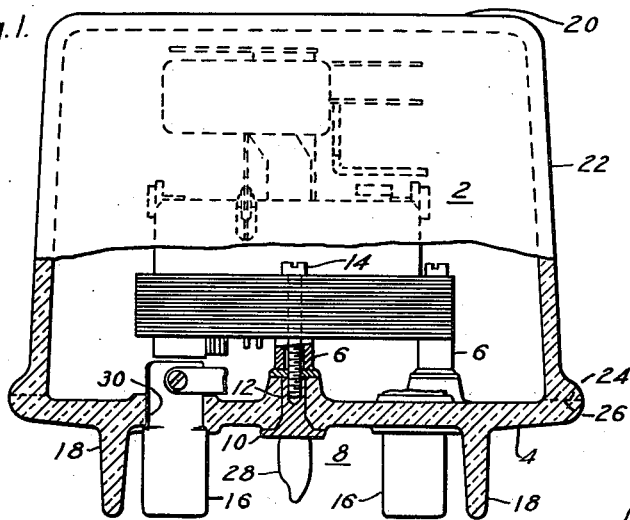
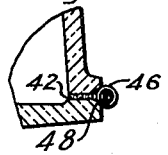
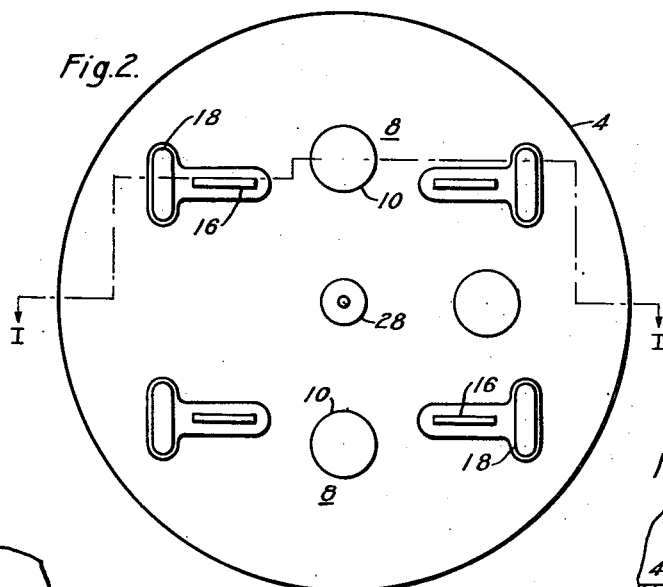
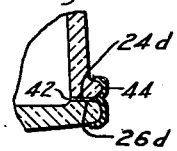
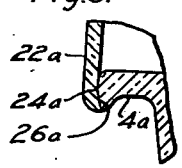
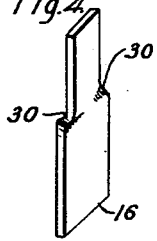
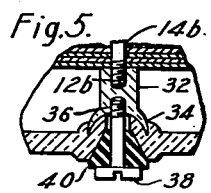
WITNESSES:
H. F. Susser
David Kreider
INVENTOR
Harry D. Madden.
BY
ATTORNEY Patented June 1, 1943

2,320,946

UNITED STATES PATENT OFFICE 2,320,946

METER CASING

Harry D. Madden, South Orange, N. J., assignor to Westinghouse Electric & Manufacturing Company, East Pittsburgh, Pa., a corporation of Pennsylvania Application March 2, 1940, Serial No. 321,942

3 Claims. (Cl. 171—34)

The present invention relates to electrical instruments and it has particular relationship to casings for instruments such as watthour meters.

Modern watthour integrating meters for household and industrial applications embody a base for mounting on the wall, a meter mechanism on the base, and a cover of substantially cup-shape covering the front and sides of the meter mechanism. It is usual to install these instruments for operation over relatively long periods of time and, in many cases, they are mounted where subject to adverse atmospheric conditions including excessive humidity. Since a gasket seal is generally employed between the base and cover, air often leaks into the chamber carrying moisture and dirt. This results in deterioration of the operating mechanism in the form of oxidation or corrosion whereby the delicate operating parts lose their accuracy. Under these conditions frequent inspection and repair is necessary to maintain the meters in acceptable operating condition.

For the purpose of overcoming these disadvantages and to eliminate the need for costly maintenance operations, it is proposed to provide a hermetically sealed chamber for the operating parts of the meter. In the present invention this is accomplished by providing a base plate, which may be either of metal or glass, with the edge or perimeter of the glass cover sealed by fusion or otherwise to the plate to positively seal the instrument against the entrance of air. Furthermore, it is proposed to exhaust the air from the casing, after which a predetermined amount of inert gas, preferably a forming gas, is introduced therein to conduct away any heat generated in the device.

Although not limited thereto, the invention will be found particularly useful with meters employing bearings which require no lubricating oil. As an example, a ball bearing similar to that described in U. S. Patent No. 1,728,507, issued on September 17, 1929, to Paszkowski, may be used.

It is accordingly an object of the present invention to provide a novel and improved instrument casing.

Another object of the invention is to provide an instrument casing within which the instrument is hermetically sealed from the outside atmosphere.

It is another object of the invention to provide a novel hermetically sealed casing for an electric meter.

A further object of the invention is to provide an electric meter with a glass casing including a cover hermetically sealed to a base by means of a fused joint or connection.

Other objects and advantages of the invention will appear from the following description taken in conjunction with the accompanying drawing in which:

Figure 1 is an elevational view, partly in section along the line I—I of Fig. 2, of an electric meter embodying the present invention;

Fig. 2 is a bottom plan view of the apparatus of Fig. 1;

Fig. 3 is a view in section of a modified form of seal;

Fig. 4 is a perspective view of an improved contact employed with the present invention;

Fig. 5 is a sectional view of a modified form of standard support;

Fig. 6 is a sectional view of another modified form of seal; and

Fig. 7 is a sectional view of a means for removing the cover when a seal similar to that shown in Fig. 6 is employed.

Referring to Figs. 1 and 2 of the drawing, there is shown a meter designated generally by 2, supported upon a base plate 4 which is preferably of glass. The meter carries standards 6, three of which are shown. These standards, in turn, are attached to standard supports 8 disposed on the base plate 4. Each of these supports 8 is made up of a nipple 10 which is embedded in the base plate and has a screw threaded hole 12 on its inner side. Bolts 14 extend through the meter standards 6 and are threaded in the holes 12. The base plate has electrodes or contacts 16 extending therethrough in sealed relationship and, in addition, is provided with insulator baffles or shields 18.

A glass cover including an end wall 20 and side walls 22 has an edge portion 24 arranged to fit snugly against a corresponding edge portion 26 on the base plate 4. The edges 24 and 26 are fused together by heat to form an integral casing structure.

To permit removal of air from the structure after it is sealed together, a glass exhaust member 28 is provided in the base plate 4. Not only may the air be removed from the casing by means of this exhaust member but an inert gas is preferably introduced into the casing thereby. Such an inert gas will serve to conduct away any heat which may be generated by the instrument.

Although the base plate 4 is preferably of glass, it will be understood that a metal stamping or casting may be employed in lieu thereof, and the cover glass disposed upon a seat adjacent the periphery of the plate. In this case, it may be desirable to weld or otherwise secure a flat ring of a metal having substantially the same coefficient of thermal expansion as glass to the seat to receive the edge of a cover glass. The alloy which is sold under the name of Kovar has been found suitable for this purpose. When the cover is wetted, it can be fused to the ring to provide an effective seal.

In Fig. 3 there is illustrated a modification of the seal shown in Fig. 1. In this case, a base plate 4a is placed within the open end of the cover with its seat 26a contacting a seat 24a on the inside of a cover side wall 22a. The base plate and cover are then fused together in a manner similar to that employed for the embodiment of Fig. 1.

The construction of the contact 16 may be more readily understood upon reference to Fig. 4. At points indicated by 30, the contact is pressed in and is fused through the base plate 4. As is shown in Fig. 1, the pressed-in portions 30 make contact with the base plate to form an effective seal.

A modified form of standard support is shown in Fig. 5. In this case a stud 32, which may be of Kovar, is fused into the base plate at 34. The stud has a screw threaded hole 12b on its inner end to receive a bolt 14b at its outer end and a screw threaded hole 36 receives a bolt 38 which rests against a resilient bushing 40 to furnish mechanical support to the fused joint.

Although, as above described, a cover glass may be sealed by fusion to a base plate to form an integral casing, it may be desirable to provide a seal of such character that the cover glass may be removed or replaced at will while at the same time maintaining the hermetical condition. Fig. 6 shows a modification of the invention in which this feature is provided. In this case, a fusible material 42 is introduced between a seat 26d of the base plate and a seat 24d on the glass cover. Heat is then applied until the fusible or sealing medium melts, whereupon the edge of the glass cover is pressed against the base plate seat 26d. When the material 42, which may, for example, be silver chloride, cools a hermetic seal results. To provide mechanical support for the seal, a supporting ring 44, which is preferably split to facilitate assembly and removal, may be employed. This ring 44 is preferably of a light weight material such as aluminum and is designed to fit snugly around the edges of the base plate and cover, as shown.

It will be understood that with this modified form of the invention, the casing may be exhausted of air and given a filling of inert gas by means of the exhaust tube 28 which has already been described.

Employing the seal shown in Fig. 6, the cover glass may be removed by applying heat to the layer of fusible material to melt it. When silver chloride is employed, the reheating does not destroy its effectiveness and it may be reheated again and the cover glass sealed back in place after the repairs or adjustments are made.

To facilitate removal of the cover by the service man in the field, the arrangement shown in Fig. 7 may be employed. In this case, a heater or resistance ring 46 may be disposed around the seal in an annular notch 48. When current is passed through the ring, localized heat will be applied to the seal to melt the material 42 and permit removal of the cover.

It will be understood that in the specification and claims, the word "hermetically" refers to a fluid type seal such as results when members are united by fusing or soldering. For example, it is not meant to include gasket seals which cannot be made completely air-tight.

Although particular forms of the invention have been shown and described, changes may be effected therein without departing from the spirit and scope thereof, as set forth in the appended claims.

I claim as my invention:

1. The combination with an integrating electrical meter, of a glass base plate supporting said meter, conducting leads from said meter passing through said base plate in sealed relationship thereto, a glass cover member having an open end arranged to fit closely against said base plate to enclose said meter, material having a lower melting point than glass disposed between the end of said cover member and the contacting surface of said base plate and fused to said adjacent surfaces to make said meter enclosing structure fluid tight, and electrical resistance heating means disposed adjacent said fused joint to heat said fusible material to melting temperature to permit removal of said cover member from said base plate.

2. The combination with an integrating electrical meter, of a glass base supporting said meter, conducting leads from said meter passing through said base plate in sealed relationship thereto, a glass cover having a flanged open end provided with a seat arranged to fit closely against said base plate to enclose said meter, material disposed between and fused to said seat on said cover member and the adjacent surface of said base plate to hermetically seal said meter enclosing structure, and a clamping ring engaging said flange on said cover member and said base plate to furnish support to said fused joint.

3. The combination with an integrating electrical meter movement including hollow supporting standards, of a glass base plate, metal supporting nipples sealed in said base plate, each of said nipples having a screw threaded hole on one side of said plate, bolts passing through said standards and screwed into said threaded holes to support said movement upon said plate, conducting leads from said movement sealed through said base plate to constitute terminal blades, a cup-shaped glass cover disposed about said meter and closed by said base plate to form an enclosure for said meter, and a continuous fused joint forming a hermetic seal between said base plate and said cover.

HARRY D. MADDEN.